Feb. 15, 1938.  M. V. CRILLON  2,108,706
CYLINDER HEAD FOR INTERNAL COMBUSTION ENGINES, FOR THE PREVAPORIZATION
OF LIGHT FUEL AND FOR CRACKING OF HEAVY OILS
Filed June 8, 1935  3 Sheets-Sheet 1
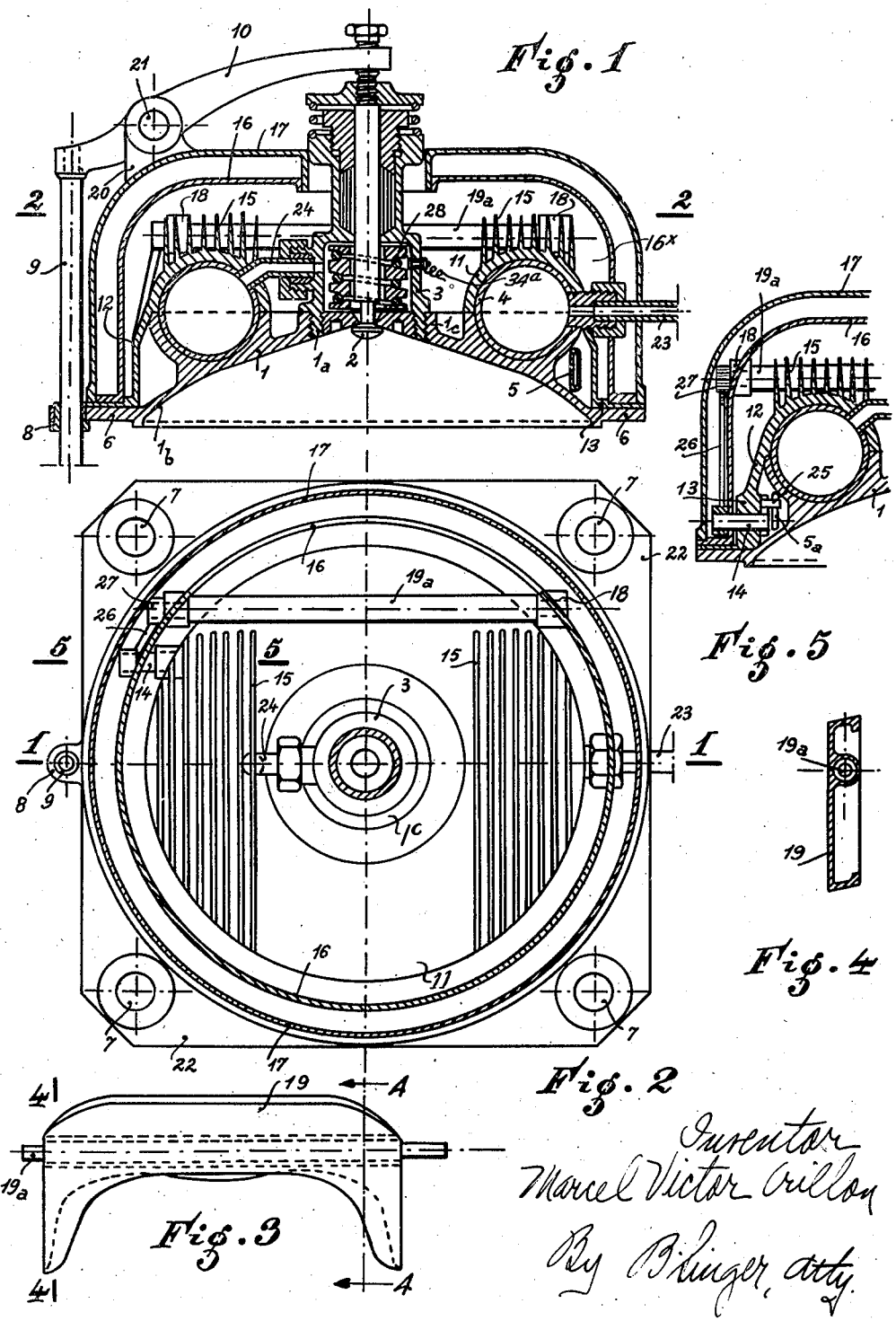

Feb. 15, 1938.　　　M. V. CRILLON　　　2,108,706
CYLINDER HEAD FOR INTERNAL COMBUSTION ENGINES, FOR THE PREVAPORIZATION
OF LIGHT FUEL AND FOR CRACKING OF HEAVY OILS
Filed June 8, 1935　　　3 Sheets-Sheet 2

Inventor
Marcel Victor Crillon
By B. Singer
Attorney

Feb. 15, 1938.  M. V. CRILLON  2,108,706
CYLINDER HEAD FOR INTERNAL COMBUSTION ENGINES, FOR THE PREVAPORIZATION
OF LIGHT FUEL AND FOR CRACKING OF HEAVY OILS
Filed June 8, 1935   3 Sheets-Sheet 3
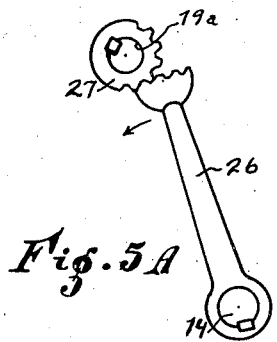
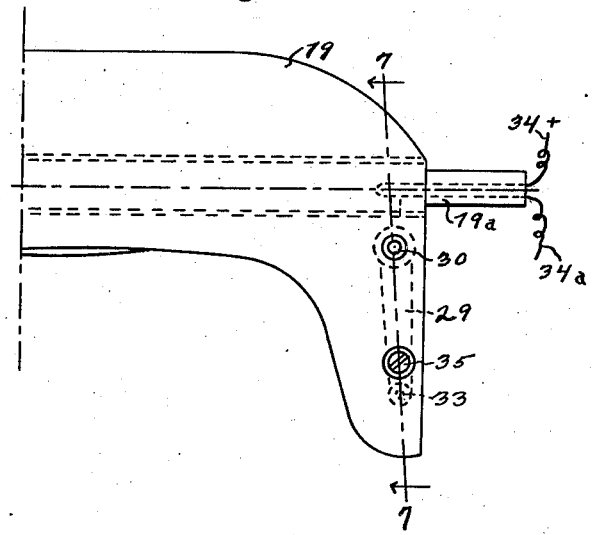
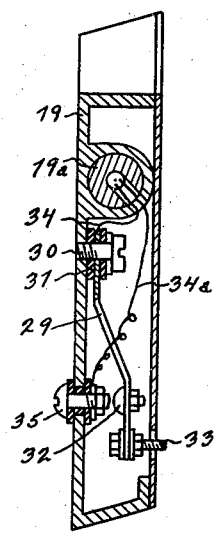
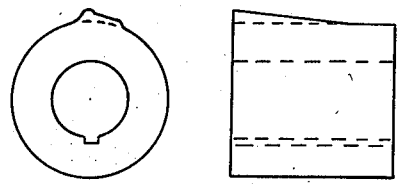
Inventor
Marcel Victor Crillon
By B. Singer
Attorney Patented Feb. 15, 1938

2,108,706

UNITED STATES PATENT OFFICE 2,108,706

CYLINDER HEAD FOR INTERNAL COMBUSTION ENGINES, FOR THE PREVAPORIZATION OF LIGHT FUEL AND FOR CRACKING OF HEAVY OILS

Marcel Victor Crillon, Marseille, France

Application June 8, 1935, Serial No. 25,652
In France September 11, 1934

3 Claims. (Cl. 123—34)

In the internal combustion engines working according to the cycle of Diesel, or the like, preference is generally given to the "solid injection method" i. e. the injection of the fuel in liquid state, which method of injection permits the fuel to be delivered under high pressure into the atomizing injector of the engine.

Yet this mode of injection, though considered as the best one until now, does not permit the obtaining, in the said kind of engine, of a speed as rapid as that attained by explosion motors.

This inferiority is especialy due to the fact that in high speed engines, with direct injection, it is very difficult to control the rate of combustion of the fuel.

To obtain as rapid and complete combustion as possible it becomes necessary to reduce the period of injection and increase the pressure. Owing to the resiliency of the pipes and fuel as well as the difficulty of obtaining very high pressures, lead to the injection being made in the form of hammer blows. The column of liquid which leads to the injector must receive such a strong impulse that it becomes a real shock. Moreover, the delayed combustion remaining always the same, a very considerable advancing of the time of injection is necessary. The whole of the fuel being therefore injected at the moment of ignition, a very high point of pressure is produced.

The result of the above is that the engine does not run smoothly and requires a costly injection pump system.

The present invention has for an object to obviate all these drawbacks by devising a special cylinder head provided with a chamber for the prevaporization and for decomposition of heavy products by cracking.

This device permits the regulation of the feeding in internal combustion engines in accordance with the explosion cycle or the injection cycle.

Such method of feeding permits the control of the combustion process in an engine with direct injection, owing to the fact that the delayed combustion is practically annihilated and fuel burns completely in proportion to its suitably determined rate of injection.

In this way it is possible to obtain very high mean pressures and a very good smooth running of the engine, together with the best thermic efficiency.

The drawings appended, to which reference is made, show, merely by way of example, a form of construction according to the invention. In the drawings:

Fig. 1 is a view in section on the line 1—1 of Fig. 2;

Fig. 2 is a section on the line 2—2 of Fig. 1;

Fig. 3 is a front view of the regulating shutter;

Fig. 4 is a section on the line 4—4 of Fig. 3;

Fig. 5 is a section on the line 5—5 of Fig. 2;

Fig. 5A is a detail view of a portion of the mechanism hereinafter referred to;

Fig. 6 is an enlarged detail front view of a part of the regulating shutter showing the location of the heater switch device thereon;

Fig. 7 is a cross section on the line 7—7 of Fig. 6;

Fig. 8 is an end elevation of the control cam for the injector;

Fig. 9 is a side elevation of the same; and

Figure 1A:
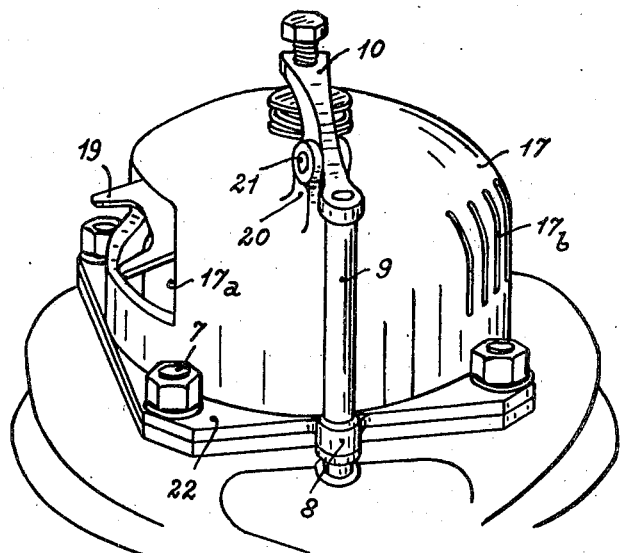
Fig. 1A is a perspective view showing the cylinder head mounted on an engine cylinder, the top portion of which only is shown.

The body of the cylinder head 1, made of a special alloy retaining good mechanical qualities at 500°, possesses on its inner or combustion chamber side, a central part 1a of conical shape which connects tangentially with a spherical zone portion 1b towards the periphery of the head. At the top of the central cone is the outlet 2 of the injector valve 3 which is screwed in the opening provided at the center of the cylinder head 1. On the outer side are provided the housings of the vaporizing chamber 4 and a thermostat 5. At the center a boss 1c receives the base of the injector. At the periphery four attachment feet or claws 6 permit the whole of the cylinder head and cylinder to be secured to the crank casing by means of four screw threaded rods 7. An ear piece 8 allows of the passage of the operating rod 9 of a rocket arm 10.

The counter part 11 of the cylinder head fits onto the body of the cylinder head 1. It consists essentially of a shell in the form of a half torus of circular section completing the housing formed, on the other hand, by the body of the cylinder head with the vaporizing chamber 4 and connecting with a circular wall 12 ending in a base 13. This latter portion closes the housing for the thermostat 5 and permits of connecting the part to the body of the cylinder head; it has in addition a bored boss for the passage of a shaft 14 which is controlled by the thermostat 5. On the outer side of this counter part for the cylinder head, there are provided cooling fins or ribs 15 cast on the mass.

Above and concentrically to these two parts 1 and 11 are secured, by the four fixing rods 7, the covers 16 and 17 which form the cooling chamber 16x and insulated thermally from the outside by a double wall. On the inner cover 16 are provided two bosses 18 for supporting the shaft 19a of the regulating shutter 19 for the circulation of air. This latter is not shown in the assembled view Fig. 1 so as not to detract from the clearness of the drawings but it is shown in detail in Figs. 3 and 4. On the external face of the second cover 17 are provided two ears 20 receiving the spindle 21 of the rocket arm 10. This cover also carries a base 22 at its lower part which base directly receives the four nuts of the fixing rods 7 securing between it and the crank casing the whole of the parts 1, 16, 17 and the cylinder. In these two covers is formed, at the front, the opening 17a for the admission of fresh air, which opening is closed by the regulating shutter 19 and at the rear are disposed slits 17b for the exhaust of hot air (Fig. 2A).

The vaporizing chamber 4, moulded in its housing between the body of the cylinder head 1 and the counter part 11 of the cylinder head, is provided with an inlet pipe 23 for the liquid fuel mixture and with a pipe 24 through which the vaporized fuel mixture is delivered to the injector 3.

Finally the thermostat 5 consists of a manometric tube in the form of an arc of a circle the fixed end of which bears on the counter part 11 of the cylinder head, transmitting at 25 (Fig. 5) its displacements, due to variations in the temperature, by its free end 5a to a shaft 14 which re-transmits it amplified by means of a toothed sector 26 gearing with a small pinion wheel 27 mounted on a shaft 19a which carries the adjustable shutter 19 for aeration.

On following the fuel mixture from where it leaves the pump feeding the cylinder head at the necessary pressure until the moment of its combustion in the cylinder the following facts will be observed.

The fuel enters in the liquid state through the inlet pipe 23 into the vaporizing chamber 4. There if it be a fuel mixture having a critical temperature lower than the temperature of decomposition, it is raised to a temperature slightly above the critical temperature in order to obtain a superheated vapour compressed above its critical pressure. If the fuel mixture is a heavy product it is raised to a suitable temperature to obtain a cracking, with the minimum of coke deposit and with the pressure necessary for injection. The injected vapour is then formed of a mixture of light and heavy products and hydrogen.

These gases take along by insufflation the uncracked liquid products. For this purpose, the temperature necessary to obtain a suitable proportion of light gases is regulated by the thermostat and the volume in the vaporizing chamber 4 depends on the velocity of cracking at the temperature of the full work. Drops of the uncracked products, formed in this manner, are injected above the ignition temperature and become instantly ignited.

The injection is effected through the tube 24 diametrally opposite to the admission tube 23, and through the injector 3. The latter, equipped with the valve 2 controlled by the tilting lever 10, possesses a chamber sufficiently great for accommodation therein of an electric heater 28 used for starting and for slow speed run or for a run at low load.

The current is established automatically in this resistance by the thermostat 5 when the temperature of the cylinder head becomes insufficient, as will be made clear by reference to Figs. 1, 6, and 7 of the drawings, and to the following:—

As shown, the contactor which establishes current in the heater 28, upon the temperature in the cylinder head having become too low, is simply controlled by the closure of the shutter 19 by the thermostat 5. For this purpose an electric wire 34, insulated from the mass of the engine by a suitable insulation which will withstand high temperatures, enters the interior of the aerating shutter through a hole provided in the axis of shaft 19a. The end of this wire, which is not shown, is connected with the pole of one source of electric current. The other end is attached to a metallic thin blade 29. This blade 29 is secured on the body of the shutter 19 by a screw 30 which is electrically insulated from the spring blade 29 by two mica washers 31. The spring blade 29 carries one contact spot 32 and one control lug 33. A second contact spot 35, insulated against the body of the shutter 19 in the same manner as the screw 30, is fixed on this shutter opposite the spot 32. This contact spot 35 is connected with the heater 28 by the return wire 34a. The return flow of the current is effected through the mass of the engine.

Current will, therefore, flow when the shutter 19 closes and comes to rest against the body of the cylinder head, thereby obstructing the passage of air for cooling in the interior of the cooling chamber. The lug 33 is electrically insulated from the spring blade 29 and projects slightly beyond the surface of the shutter 19. It is forced into the closed shutter 19, compressing the spring blade 29 until the contact spots 32 and 35 enter into engagement. Contact is then established, and the current passes into the heater. As soon as the shutter 19 opens to admit air, the spots 32 and 35 again move away from each other and the current is interrupted.

The thermostat is constructed in such manner that it regulates the temperature of the cylinder head in function of the cracking speeds adapted themselves to the varying consumptions of the engine.

The vaporization chamber 4 is easily exchangeable in case of being soiled by coke.

If there should be no source of electric energy available on the machine to be moved by the engine, gasoline may be used for starting readily, even at low atmospheric temperature. For this purpose the engine is first fed with gasoline, and heavy oil is substituted as soon as the necessary temperature for continuing the feed of the heavy fuel is properly attained.

The gasoline being injected in cold condition for starting is simply atomized in the same way as if it were injected in solid form. The timing of the ignition is not disturbed, but remains below the permissible limit for those rotary speeds which upon starting also are lowered. This solid injection ceases as soon as the cylinder head is properly heated.

The control cam of the injection means has a variable profile. It is shown diagrammatically in Figs. 8 and 9. The tail end of the push rod 9a is shifted by any suitable means along the cam, so that it remains in contact with the contour which has been selected in accordance with the requirement to produce the desired injection.

The fuel mixture is injected into the combustion chamber in the form of a conical gaseous sheet projected onto the cylinder head in such a manner that there is set up a whirling movement, the gaseous sheet then takes the form of a torus in which is scavenged and burnt the remains of the charge which has been injected. Retarded ignition no longer exists. In fact, in the ordinary methods of injection, the delay in ignition is the addition of two times: firstly, the time necessary for the vaporizing of the liquid on the surface of driplets, then the time of penetration of the heat necessary for obtaining the temperature right to the center of this driplet. It is obvious that these two causes of delay are cancelled when the fuel mixture is injected in the form of vapour raised, before its injection, above the ignition temperature. It is necessary that this vapour should be a superheated vapour before its injection in order to avoid formation of driplets by reason of the expansion which occurs at the moment of injection. It will be clear that the combustion curve is no longer produced haphazardly regardless of the possible condition of injection, but that it can be graphed in advance to obtain the qualities which it is desired to give to the motor.

As above stated, the fuel is injected in the form of a conical gaseous sheet and projected upon the cylinder head in such manner that whirling movements are produced.

Figure 2A:
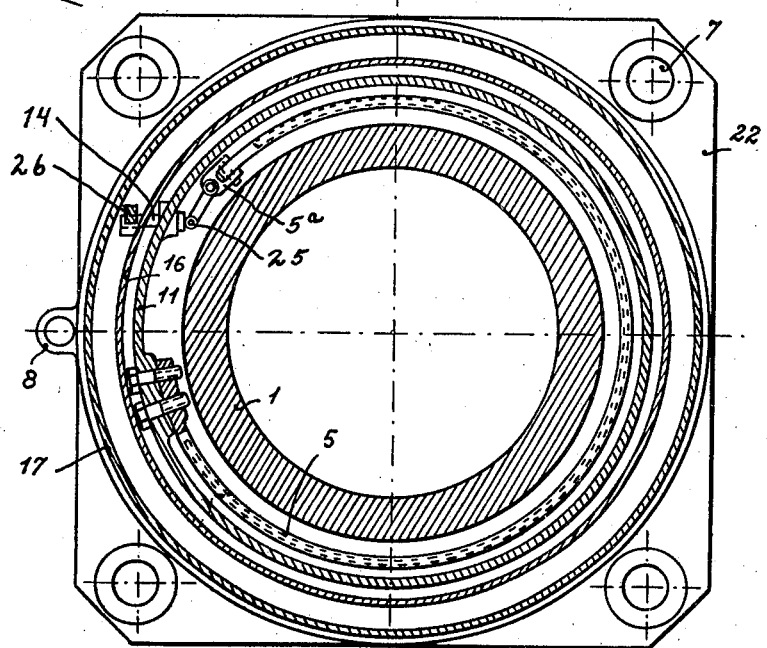
Fig. 2A is a section of the cylinder head similar to Fig. 2 but on a horizontal plane passing through the manometric tube 5.
Figure 10:
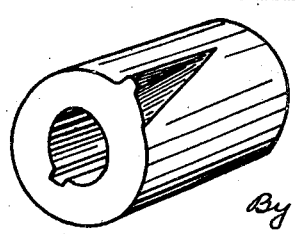
Fig. 10 is a perspective view of the cam.

The explanation of this movement will appear by reference to Fig. 1. In this figure it will be seen that the angle of the cone of the injector valve 2 is the same as the angle of the cone at the inner face of the cylinder head 1. The sheet of liquid which emanates from the injector opening, guided between the valve and its seat, will therefore have a conical shape with the same cone angle as that of the valve and of the cylinder head. This liquid injected body of conical sheet form will maintain this shape unless an obstacle is presented to it. Now, where the cylinder head changes its shape at the point where in the drawings a spherical zone is shown, the liquid body must adapt itself to this shape and also must assume a curvature. This curvature induces a depression in the central portion, and the whirling movement is thereby retarded in conformity with the laws controlling the dynamics of liquids.

The same feeding system may be applied to very rapid motors for aeronautic purposes, as well as for the motor cars and also for the fixed industrial motors. In these fixed motors it is possible to obtain combustion curves realizing the cycle of the best efficiency, by a suitable regulation of the injection time and of the output of injection.

It is obvious that the same principles of realization apply in an equally efficient manner to all kinds of motors, for example to four stroke motors, to two stroke motors with opposite pistons, and so on. For the motors comprising a plurality of cylinders, it is of course possible to provide cylinder heads forming a block feeding any number of cylinders. In fixed motors having bores of great diameter it is possible to multiply the number of injectors in the same cylinder head. All such solutions are possible in endless variations while constituting different embodiments of one and the same idea forming the subject-matter of the present invention.

What I claim is:

1. In an internal combustion engine of high compression and compression ignition, a cylinder head, a vaporizing chamber therein, an injector at the center of said head, a thermostat comprising a manometric tube in the shape of an arc of a circle, said cylinder head having an annular groove to receive said tube, a counter-head forming with said cylinder head a housing, a fuel vaporizing tube in said housing, a duct from said vaporizing tube to said injector, a curved surface on said counter head to which one of the extremities of said manometric tube is attached, two covers on said cylinder head to form a cooling chamber between them and the upper surface of said counter head, said covers having openings for admission of fresh air, and actuating means for said shutter to which means the other extremity of said manometric tube is attached to secure the aeration of said cooling chamber according to the temperature prevailing at the summit of the combustion chamber.

2. In an internal combustion engine of high compression and compression ignition, a cylinder head, a vaporizing chamber therein, an injector at the center of said head, a thermostat comprising a manometric tube in the shape of an arc of a circle, said cylinder head having an annular groove to receive said tube, a counter head forming with said cylinder head a housing, a fuel vaporizing tube in said housing, a duct from said vaporizing tube to said injector, a curved surface on said counter head to which one of the extremities of said manometric tube is attached, two covers on said cylinder head to form a cooling chamber between them and the upper surface of said counter head, said covers having openings for admission of fresh air, actuating means for said shutter to which means the other extremity of said manometric tube is attached to secure the aeration of said cooling chamber according to the temperature prevailing at the summit of the combustion chamber, an electric heater in said injector and means actuated automatically by said thermostat, when the temperature of the cylinder head becomes insufficient, for energizing said heater.

3. In an internal combustion engine of high compression and compression ignition, a cylinder head, a removable counter cylinder head having cooling ribs, said cylinder heads each having opposing grooves, a housing constituting a vaporizing chamber held in said grooves, means to admit fuel to said vaporizing chamber, an injector valve device carried centrally by said cylinder head, a duct between said vaporizing chamber and said valve, a pair of covers spaced apart and mounted on said cylinder head so as to enclose said counter cylinder head, said covers being spaced from said counter cylinder head to provide a cooling chamber, said covers having openings for admission of cooling air and having outlets for exhaust of hot air, a valve to control the inlet air, a thermostat including a manometric tube located between a wall of said counter cylinder head and a wall of said cylinder head, and a connection between said tube and said valve for operating the same to secure the aeration of said cooling chamber according to the temperature prevailing at the summit of the combustion chamber and thereby regulate automatically the decomposition of the fuel.

MARCEL VICTOR CRILLON.